(12) United States Patent
Ito (10) Patent No.: US 11,175,879 B2
(45) Date of Patent: Nov. 16, 2021

(54) INFORMATION PROCESSING METHOD, INFORMATION PROCESSING DEVICE, AND AUDIO INTERFACE

(71) Applicant: YAMAHA CORPORATION, Hamamatsu (JP)

(72) Inventor: Takashi Ito, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/690,258

(22) Filed: Nov. 21, 2019

(65) Prior Publication Data

US 2020/0159488 A1    May 21, 2020

(30) Foreign Application Priority Data

Nov. 21, 2018  (JP) .............................. JP2018-218177

(51) Int. Cl.
*G06F 3/16* (2006.01)
*H04L 29/06* (2006.01)
*G06F 9/54* (2006.01)

(52) U.S. Cl.
CPC .............. *G06F 3/162* (2013.01); *G06F 9/542* (2013.01); *G06F 9/544* (2013.01); *H04L 65/601* (2013.01)

(58) Field of Classification Search
CPC ............. H04M 3/5238; H04M 3/5175; H04M 3/5232; H04M 1/72555; H04M 2250/64; H04M 15/8061; H04M 2201/12; H04M 2201/36; H04M 3/42068; G10L 13/04; G10L 25/84; G10L 2021/02085; G10L 2021/02163; G10L 2025/783; G10L 21/0232; G10L 25/48; G10L 25/51; H04B 1/713; H04B 17/309; H04B 17/318; H04R 1/025; H04R 1/028; H04R 2400/03; H04R 2499/13; H04R 3/12; H04R 5/023; H04H 20/103; H04H 20/42; H04L 67/20; H04L 67/26; H04L 67/325; H04L 61/6022; H04L 41/0681; H04L 43/0811; H04L 63/0442; H04L 63/061; H04L 63/08; H04L 67/34; H04L 65/601; H04L 1/0002; H04L 1/0041; H04L 1/18; H04L 51/04; H04L 51/28; H04L 51/32; H04L 5/0064;

(Continued)

(56) References Cited

U.S. PATENT DOCUMENTS 5,628,013 A * 5/1997 Anderson ............. G06F 9/4887
                                                              718/107
2005/0009546 A1 * 1/2005 Shimizu ............... G10H 1/0058
                                                              455/502

(Continued)

FOREIGN PATENT DOCUMENTS

JP    2005176233 A    6/2005
JP    2006333142 A    12/2006
JP    2009060535 A    3/2009

*Primary Examiner* — Lun-See Lao
(74) *Attorney, Agent, or Firm* — Rossi, Kimms & McDowell LLP (57) ABSTRACT

An information processing method includes storing, in a memory, a sound signal transmitted from the outside by using a first transmission method in which a bandwidth is guaranteed and timing is restricted, and processing, using a processor, the sound signal stored in the memory upon a predetermined data size of the sound signal being stored in the memory.

6 Claims, 9 Drawing Sheets

(58) Field of Classification Search
CPC ............. H04L 65/1059; H04L 65/4069; H04L 65/4084; H04L 65/605; H04L 65/607; H04L 67/1097; H04L 67/12; H04N 21/23424; H04N 21/2385; H04N 21/2393; H04N 21/478; H04N 21/812; H04N 21/8456; H04N 5/2228; H04N 5/232; H04N 5/247
USPC .............................................. 381/26; 700/94
See application file for complete search history.

(56) References Cited

U.S. PATENT DOCUMENTS

| | | | | |
|---|---|---|---|---|
| 2005/0120130 | A1* | 6/2005 | Ohkawa | H04L 47/28 709/232 |
| 2006/0242340 | A1* | 10/2006 | Ono | H04N 5/23245 710/62 |
| 2006/0282598 | A1* | 12/2006 | Takeuchi | G06F 13/387 710/305 |
| 2011/0295667 | A1* | 12/2011 | Butler | G06Q 30/0239 705/14.12 |
| 2017/0048609 | A1* | 2/2017 | Schnell | H04R 1/1083 |

\* cited by examiner

PRIOR ART

| PACKET NUMBER | DATA VOLUME | SOUND SIGNAL | PACKET NUMBER |
|---|---|---|---|

INFORMATION PROCESSING METHOD, INFORMATION PROCESSING DEVICE, AND AUDIO INTERFACE

CROSS REFERENCE TO RELATED APPLICATIONS

This Nonprovisional application claims priority under 35 U.S.C. § 119(a) on Patent Application No. 2018-218177 filed in Japan on Nov. 21, 2018 the entire contents of which are hereby incorporated by reference.

BACKGROUND

1. Field

A preferred embodiment of the invention relates to an information processing method, an information processing device, and an audio interface.

2. Description of the Related Art

Unexamined Japanese Patent Publications No. 2005-176233, No. 2009-060535, and No. 2006-333142 disclose a USB (Universal Serial Bus) data transfer method in a personal computer (hereinafter, simply referred to as a PC).

For instance, Unexamined Japanese Patent Publications No. 2005-176233 and No. 2009-060535 describe that moving images are transmitted by using a bandwidth-guaranteed isochronous method and still images are transmitted by using a bulk method.

Further, Unexamined Japanese Patent Publication No. 2009-060535 describes a configuration in which cycle time in an isochronous method is made variable.

In an isochronous method, a notification, which includes information on data size, is performed at every predetermined time (e.g., 1 msec). When the notification is performed, a driver determines whether or not the data size, which has been transmitted, reaches a predetermined data size allowed to be processed by a host application program. When determining that the data size does not reach the predetermined data size, the driver waits until the next notification is performed. In this case, a non-negligible delay is likely to occur in an application program for processing sounds.

Further, in a method without any restriction on timing, such as a bulk method or an interrupt method, the host application program can perform processing at the time when the data size reaches the predetermined data size allowed to be processed. In the bulk method and the interrupt method, however, a bandwidth is not guaranteed. Thus, if data is interrupted, a serious problem will occur in an application program for processing sounds.

SUMMARY

Accordingly, a preferred embodiment of the invention is to provide an information processing method that prevents sound interruption while reducing a delay, an information processing device, and an audio interface.

The information processing method includes storing, in a memory, a sound signal transmitted from the outside by using a first transmission method in which a bandwidth is guaranteed and timing is restricted, and processing, using a processor, the sound signal stored in the memory upon a predetermined data size of the sound signal being stored in the memory.

The above and other elements, features, steps, characteristics and advantages of the present invention will become more apparent from the following detailed description of the preferred embodiments with reference to the attached drawings.

DETAILED DESCRIPTION OF THE EXEMPLARY EMBODIMENTS

An information processing system in accordance with one embodiment of the present invention includes an audio interface and an information processing device.

The audio interface includes a communication interface that transmits a sound signal, and a processor that controls the communication interface to transmit the sound signal using a first transmission method in which a bandwidth is guaranteed and timing is restricted.

The information processing device includes: a communication interface that receives a sound signal transmitted from the outside; a memory that stores the sound signal; and a processor that processes the sound signal stored in the memory upon a predetermined data size of the sound signal being stored in the memory.

Figure 1:
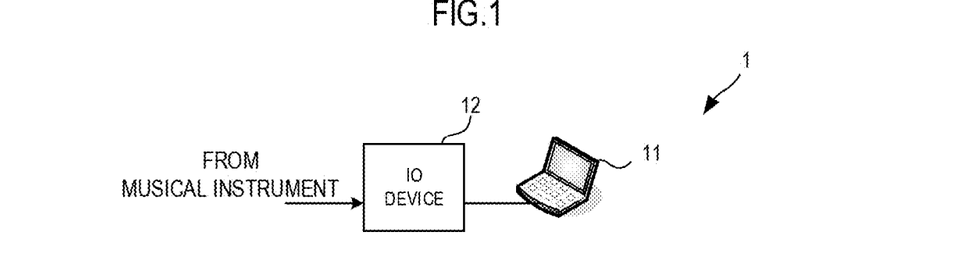
FIG. 1 is a block diagram showing a configuration of an information processing system 1.

FIG. 1 is a block diagram showing a configuration of an information processing system. The information processing system 1 includes a PC 11, which is an example of an information processing device, and an IO device 12, which is an example of an audio interface.

The PC 11 and the IO device 12 are connected to each other through a communication interface such as a USB (Universal Serial Bus), IEEE1394, a LAN (Local Area Network), or a MIDI (Musical Instrument Digital Interface).

Figure 2:
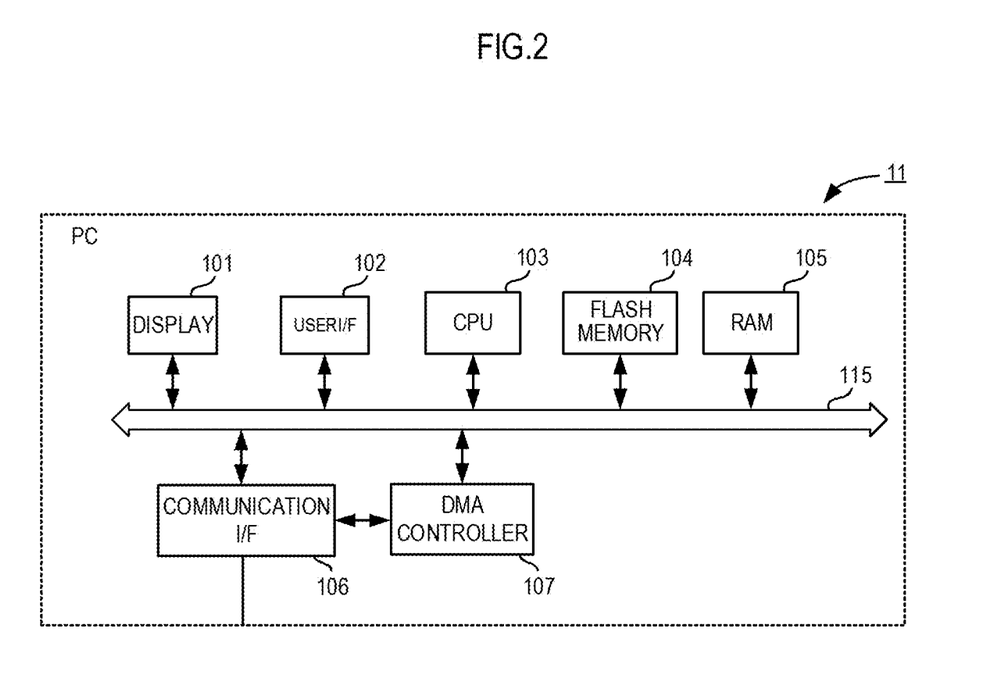
FIG. 2 is a block diagram showing a configuration of a PC 11.

FIG. 2 is a block diagram showing a configuration of the PC 11. The PC 11 includes a display 101, a user interface (I/F) 102, a CPU 103, a flash memory 104, a RAM 105, and a communication interface (I/F) 106. These components are connected to a bus 115.

The display 101 is constituted by an LCD (Liquid Crystal Display), for example, and displays various information. The user I/F 102 is constituted by a mouse, a keyboard, or the like, and receives a user's operation. The user I/F 102 is combined with the display 101 to constitute a GUI (Graphical User Interface).

The CPU 103 corresponds to a controller. The CPU 103 reads a program memorized in a flash memory 104, which serves as a storage medium, into the RAM 105 to achieve a predetermined function. For instance, an operation image for receiving a user's operation is displayed on the display 101 by the CPU 103, and a selection operation or the like is received on the operation image through the user I/F 102, so that the GUI is achieved.

Further, the CPU 103 reads out application programs for editing music (hereinafter, referred to as a DAW) from the flash memory 104 to achieve the GUI in accordance with these programs. The RAM 105 also functions as a work memory of the DAW.

Figure 3:
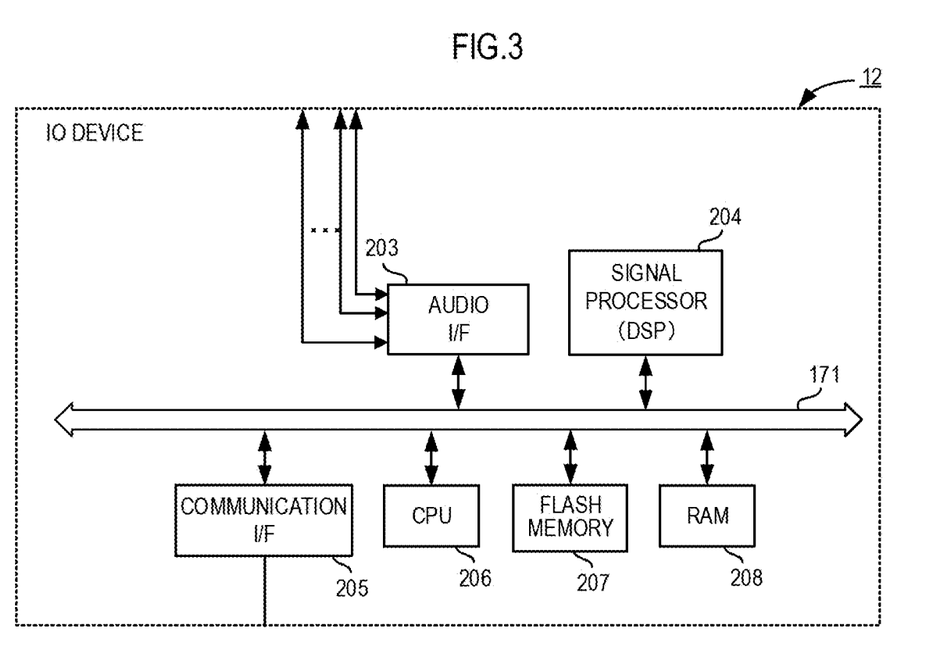
FIG. 3 is a block diagram showing a configuration of an IO device 12.

FIG. 3 is a block diagram showing a configuration of the IO device 12. The IO device 12 includes an audio interface (I/F) 203, a signal processor 204, a communication interface (I/F) 205, a CPU 206, a flash memory 207, and a RAM 208.

These components are connected to one another through a bus. Further, the audio I/F 203 and the signal processor 204 are also connected to a waveform bus for transmitting a sound signal.

The CPU 206 is an audio interface controller that controls an operation of the IO device 12. The CPU 206 reads a predetermined program memorized in the flash memory 207, which serves as a storage medium, into the RAM 208 to execute it, so that various kinds of operations are performed. For instance, based on various kinds of commands received from the PC 11 through the communication I/F 205, the CPU 206 performs input and output of the sound signal in the audio I/F 203, mixing processing in the signal processor 204, control of effect processing, change of a parameter set value, or the like.

The signal processor 204 is constituted by a DSP for performing various kinds of signal processing, such as mixing processing or effect processing. The signal processor 204 applies effect processing, such as mixing or equalizing, on the sound signal inputted through an input terminal in the audio I/F 203.

By the CPU 206, the sound signal subjected to the signal processing in the signal processor 204 is outputted through an output terminal in the audio I/F 203. Alternatively, by the CPU 206, the sound signal subjected to the signal processing in the signal processor 204 is outputted to the PC 11 through the communication I/F 205.

By the CPU 206, the sound signal subjected to the signal processing in the signal processor 204 is transmitted to the PC 11 as packet data according to a predetermined telecommunications standard.

Figure 4:
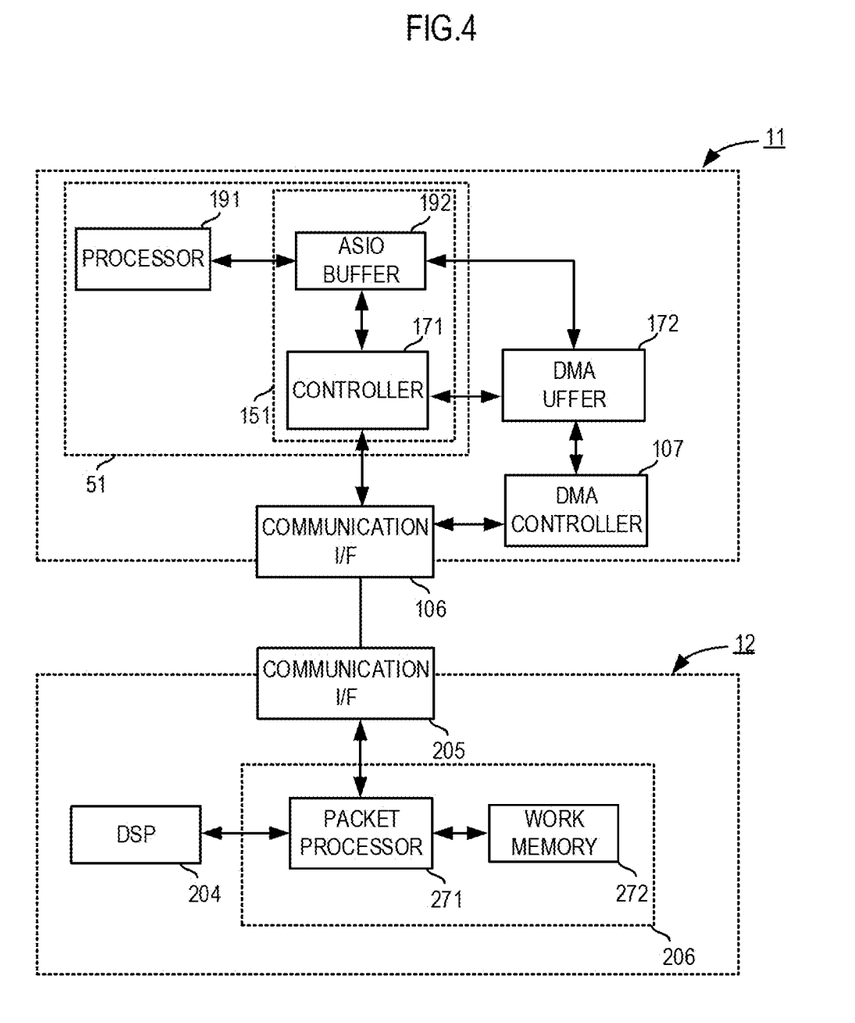
FIG. 4 is a block diagram showing a functional configuration of the PC 11 and the IO device 12.

FIG. 4 is a block diagram showing a functional configuration of the PC 11 and the IO device 12. FIG. 4 is also a block diagram showing a functional configuration of the DAW 51 and an audio interface driver 151. In this example, the communication interface 106 and the communication interface 205 are interfaces according to a USB standard.

The CPU 206 includes a packet processor 271 and a work memory 272, functionally. The work memory 272 is achieved by using the RAM 208. By the packet processor 271, the sound signal subjected to the signal processing in the signal processor 204 is stored in the work memory 272. The packet processor 271 transmits the sound signal, which is stored in the work memory 272, through the communication interface 205 as packet data including predetermined data size.

The CPU 103 of the PC 11 reads out a program from the flash memory 104 to constitute the DAW51 and the audio interface driver 151. The audio interface driver 151 includes a controller 171 and an ASIO (Audio Stream Input Output) buffer 192, functionally.

A processor 191 is a functioner for performing a main function in the DAW 51. The processor 191 uses the sound signal stored in the ASIO buffer 192 to perform various kinds of processing. For instance, the processor 191 reads out the sound signal stored in the ASIO buffer 192 to perform predetermined signal processing. Further, the processor 191 transmits the sound signal subjected to the signal processing to the IO device 12.

The audio interface driver 151 is a device driver installed in an OS (Operating System) of the PC 11. In this example, the audio interface driver 151 is a driver according to a USB standard. Further, the audio interface driver 151 is constituted as an API (Application Programming Interface) for inputting and outputting data to and from the DAW 51.

The DMA controller 107 can transmit and receive data to and from a DMA buffer 172, not through the CPU 103. The DMA controller 107 stores, in the DMA buffer 172, the data received from the communication interface 106. The DMA controller 107 also performs the following operation, i.e., reads out an operation program from the flash memory 104, a storage medium built in a hardware chip of the DMA controller 107, or other storage media, and then stores the received data in the DMA buffer 172.

Figure 5:
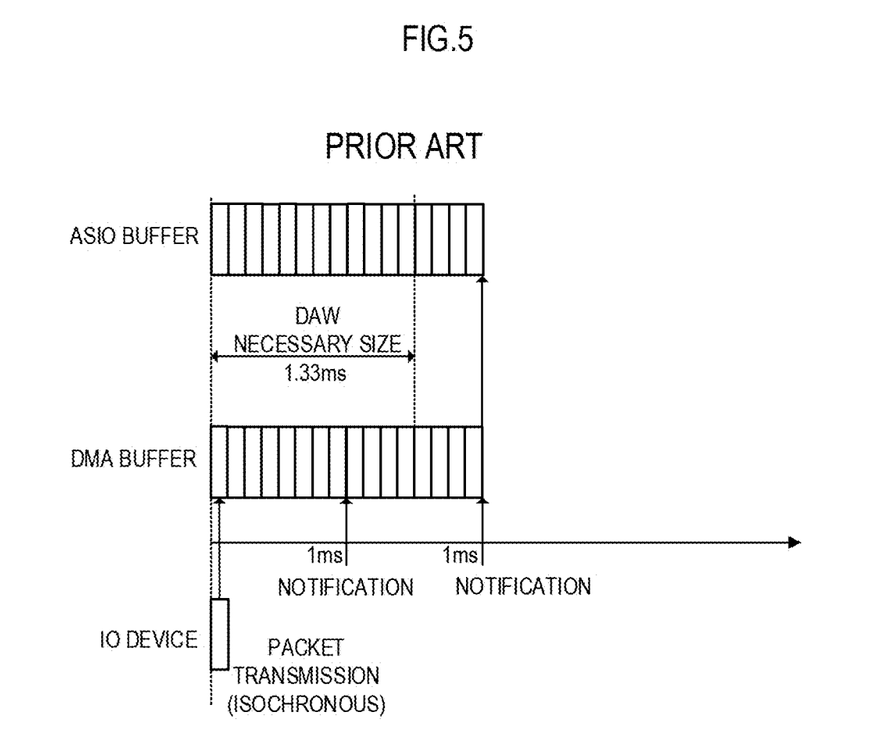
FIG. 5 is a conceptual diagram (comparative example) showing an operation of the conventional audio interface driver.
Figure 6:
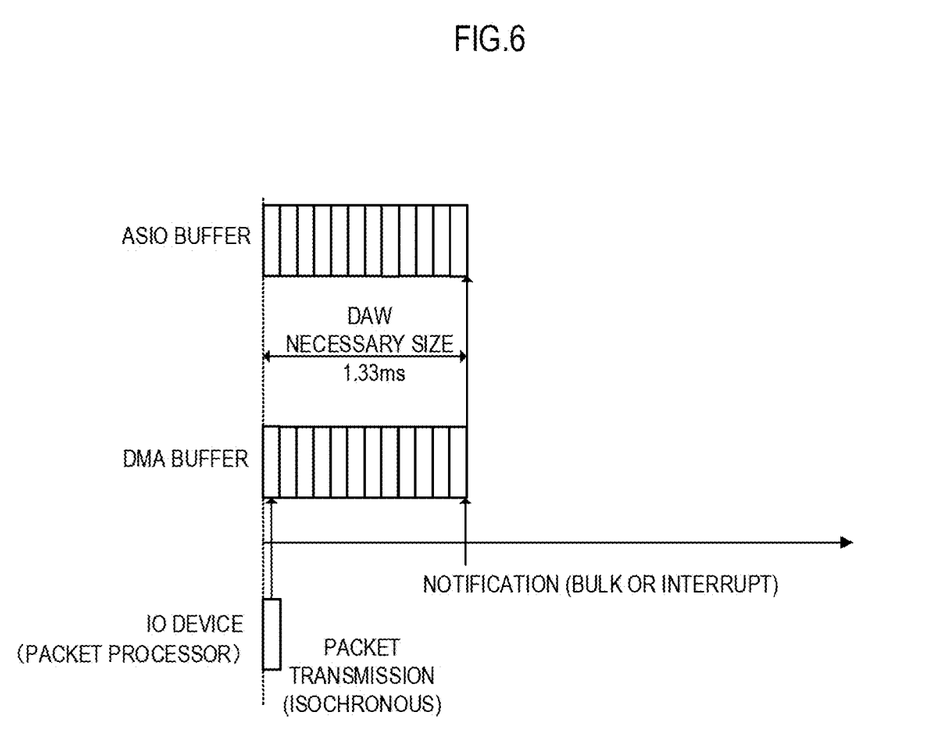
FIG. 6 is a conceptual diagram showing an operation of an audio interface driver 151 of the present embodiment.

FIG. 5 is a conceptual diagram showing an operation of the conventional audio interface driver as a comparative example, and FIG. 6 is a conceptual diagram showing an operation of the audio interface driver 151 of the present embodiment.

First, the operation of the conventional audio interface driver will be described with reference to FIG. 5. The operation of FIG. 5 shows an example in which data is transmitted to an application program of a PC, serving as a host, from a USB device by using an isochronous method. Data transmission by using an isochronous method is a suitable method for transmitting and receiving data (e.g., sound signal) in which no interruption is allowed, because some bandwidth is guaranteed.

The IO device transmits the packet data including predetermined data size to the PC at every elapse of predetermined time. For instance, in the data transmission by using an isochronous method, a USB device transmits one packet data at every elapse of 125 μsec. The data size of one packet data in an isochronous method is variable (unfixed). As an example, packet data includes data having six samples of sound signals sampled at a sampling rate of 44.1 kHz.

The DMA controller of the PC stores the received packet data in a DMA buffer. Further, the IO device performs a notification of a transmission result at every elapse of predetermined time. In data transmission by using an isochronous method, one cycle is set to 1 msec to perform the data transmission. Accordingly, in the data transmission by using an isochronous method, the notification is performed at every 1 msec, including information indicating data size of the packet data transmitted during one cycle.

With reference to the information indicating the data size included in the notification that has been transmitted from the IO device, the audio interface driver of the PC determines whether or not data size of a minimum size required for a host application program (DAW) is stored in the work memory.

The data size of a minimum size required for the DAW is a sound signal of 64 samples (data corresponding to 1.33 msec), for example. As mentioned above, in an isochronous method, one cycle is set to 1 msec to perform data transmission. At this time, data size does not reach the data size of a minimum size required for the DAW, i.e., the data corresponding to 1.33 msec. Therefore, at this time, processing in the DAW is not performed.

When 1 msec further elapses, i.e., 2 msec elapses totally, the notification is performed again from the IO device. When 2 msec elapses, the data size of a minimum size required for the DAW, i.e., the data corresponding to 1.33 msec has already been transmitted. Therefore, the audio interface driver determines that the data size of a minimum size required for the DAW has been transmitted to the DMA buffer, thereby transmitting the data in the DMA buffer to the ASIO buffer. The DAW reads out the sound signal from the ASIO buffer and performs processing.

Basically, in the conventional method, at the time when 1.33 msec elapses, the data (sound signal of 64 samples) of a minimum size required for the DAW has already been transmitted to the DMA buffer. In the data transmission by using an isochronous method, however, processing of the DAW is performed at every elapse of 1 msec or 2 msec, because a notification is performed at every 1 msec.

Next, the operation of the audio interface driver 151 in the present embodiment will be described with reference to FIG. 6. In the present embodiment as well, the IO device 12 transmits data by using an isochronous method.

The packet processor 271 of the IO device 12 transmits packet data having predetermined data size (e.g., six samples) to the PC 11 at every elapse of predetermined time (125 μsec), according to an isochronous method. The DMA controller 107 of the audio interface driver 151 stores the received data in the DMA buffer 172.

Figure 7:
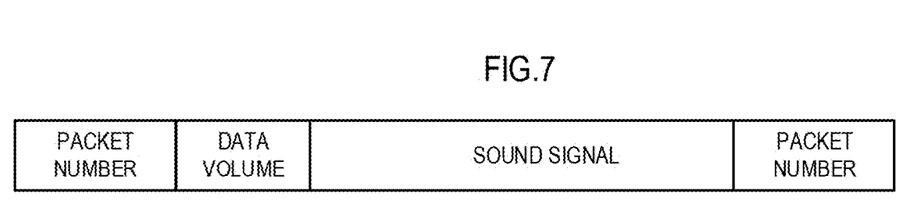
FIG. 7 is a view showing a configuration of packet data in the present embodiment.

FIG. 7 is a view showing a configuration of packet data in the present embodiment. The packet data in the present embodiment includes identification information (hereinafter, referred to as a packet number), information indicating data size (hereinafter, referred to as a packet length), and data of a sound signal. The packet number is included in a head and an end of the packet data.

By referring to the packet length of each packet data stored in the DMA buffer 172, the controller 171 can understand the data size currently stored in the DMA buffer 172. Further, by referring to the packet length of each packet data, the packet processor 271 of the IO device 12 can understand whether the data size of a minimum size (64 samples) required for the DAW51 has been transmitted to the PC 11 or not.

When the data size of a minimum size (64 samples) required for the DAW51 has been transmitted, the packet processor 271 of IO device 12 performs a notification by using a bulk method or an interrupt method. In the bulk method or the interrupt method, there is no restriction on timing of the notification, although a bandwidth is not guaranteed. Therefore, at the time when the data size of 64 samples has been transmitted, the packet processor 271 can perform a notification with respect to the PC 11.

When receiving the notification, the controller 171 of the audio interface driver 151 transmits the data currently stored in the DMA buffer 172 to the ASIO buffer 192. Thus, the processor 191 of the DAW 51 can process the sound signal.

Note that, even if not receiving the notification from the IO device 12, the controller 171 of the audio interface driver 151 may transmit the data currently stored in the DMA buffer 172 to the ASIO buffer 192, when determining that the data size of 64 samples is stored in the DMA buffer 172.

In the present embodiment as well, data transmission is performed by using an isochronous method. On the other hand, a notification is performed by using a bulk method or an interrupt method. Therefore, the processor 191 can start processing of the sound signal at the time when the data size of 64 samples has been transmitted. In the data transmission of the present embodiment, the sound signal of 64 samples is transmitted at the time when 1.33 msec elapses, and the notification is performed at the time when 1.33 msec elapses. Therefore, the processor 191 can perform the processing at the time when 1.33 msec elapses.

In this way, the audio interface driver 151 of the present embodiment stores, in the DMA buffer 172, the sound signal transmitted from the outside by using a first stored method (isochronous method) in which a bandwidth is guaranteed and timing is restricted, and causes the processor 191 to process the sound signal, when the sound signal of a predetermined data size (64 samples) has been stored in the DMA buffer 172. Thus, the audio interface driver 151 of the present embodiment can reduce a delay, without interrupting a sound.

Note that, FIG. 7 shows an example in which packet data includes a packet length, but it is not essential that packet data includes a packet length in the present invention. As long as data size is understood, any other technique may be employed in the present invention. For instance, the DMA controller 107 writes all zero values into the DMA buffer 172 as an initial value. If data other than zero value is written into the DMA buffer 172, the controller 171 will determine that data transmission is performed. At the time when the data other than zero value reaches the minimum size (64 samples) required for the DAW51, the controller 171 transmits data to the ASIO buffer 192. Further, after the data is transmitted to the ASIO buffer 192, the controller 171 rewrites the data, which has been transmitted, to zero value. Thus, the controller 171 can understand data size.

Figure 8:
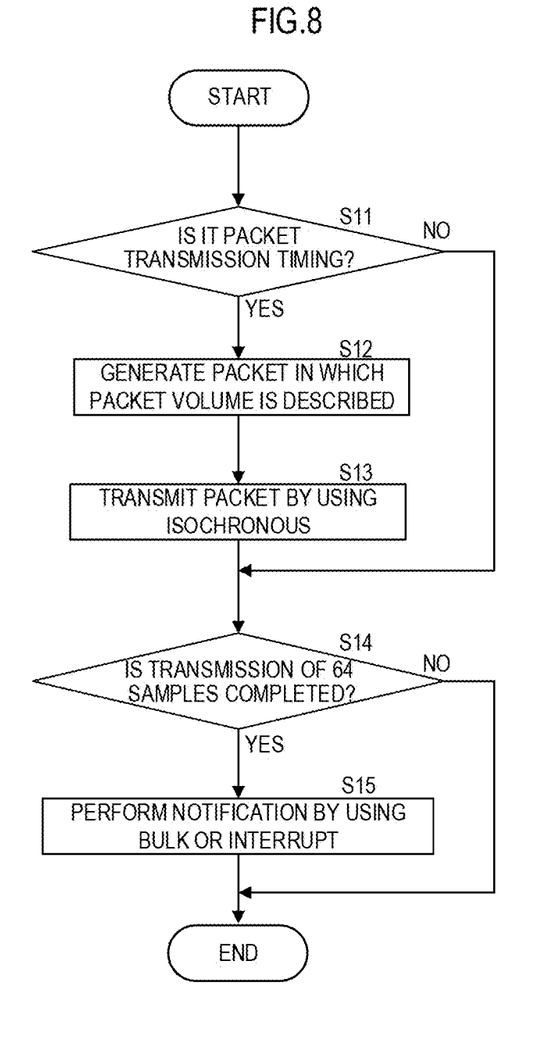
FIG. 8 is a flowchart showing an operation of the IO device 12.
Figure 9:
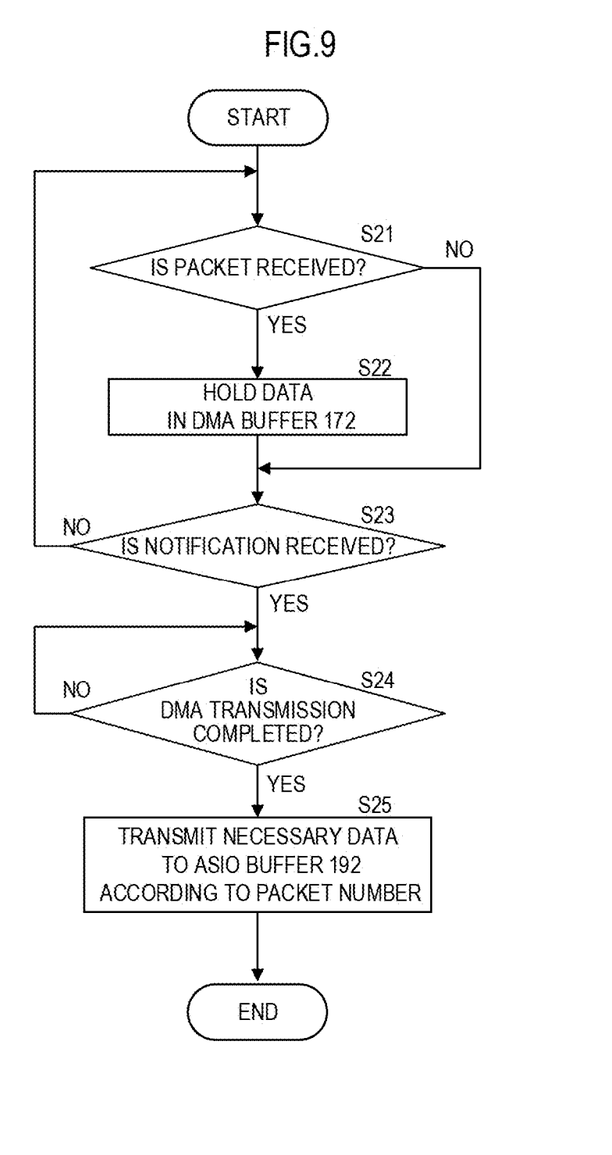
FIG. 9 is a flowchart showing an operation of the PC 11.

Next, FIG. 8 is a flowchart showing an operation of the IO device 12. FIG. 9 is a flowchart showing an operation of the PC 11.

First, the packet processor 271 of the IO device 12 determines whether it is transmission timing (125 μsec) of packet data or not (S11). Herein, the transmission timing is defined in an isochronous method. When determining that it is the transmission timing, the packet processor 271 generates the packet data in which data size is described, as shown in FIG. 7 (S12). Note that, the data size of one packet data is variable in an isochronous method, as mentioned above. Thus, the data size of the packet data may be varied for every transmission timing.

Next, the packet processor 271 transmits the generated packet data to the PC 11, according to an isochronous method (S13). On the other hand, when determining that it is not the transmission timing, the packet processor 271 skips the processing of S12 and S13.

Subsequently, after the operation is started, or after the last notification is transmitted, the packet processor 271 determines whether the data of 64 samples has been transmitted or not (S14). In the present embodiment, the data size required for the DAW51 is 64 samples. Therefore, the packet processor 271 determines whether the data of 64 samples has been transmitted or not. In the case where the data size required for the DAW51 has different values (e.g., 48 samples), however, the packet processor 271 determines whether the data of 48 samples has been transmitted or not.

When determining that the data of 64 samples has been transmitted, the packet processor 271 notifies the PC 11 by using a bulk method or an interrupt method (S15).

On the other hand, as shown in FIG. 9, the DMA controller 107 of the PC 11 determines whether packet data has been received from the IO device 12 or not (S21). When the packet data has been received from the IO device 12, the DMA controller 107 stores the packet data in the DMA buffer 172 (S22). When the packet data has not been received from the IO device 12, the processing of S22 is skipped.

After that, the controller 171 of the audio interface driver 151 determines whether the notification has been received from the IO device 12 or not (S23). When the notification has not been received, the PC 11 repeats processing from the operation of S21.

When the notification has been received from the IO device 12, the controller 171 waits until the DMA controller 107 has completely transmitted the data to the DMA buffer 172 (S24).

As for data transmission of the present embodiment, the data transmission itself is performed by using an isochronous method. On the other hand, a notification is performed by using a bulk method or an interrupt method in which timing is not restricted. Accordingly, at the timing when the data transmission by using an isochronous method is not completed, the notification may be performed.

To avoid the above-mentioned situation, when receiving the notification from the IO device 12, the controller 171 waits until the DMA controller 107 has completely transmitted the data to the DMA buffer 172. For instance, to understand whether the data transmission is completed or not, the packet number included in the packet data is referred. As shown in FIG. 7, the packet number is included in a head and an end of packet data. In the packet data stored in the DMA buffer 172, if the same packet number is described in the head and the end, the controller 171 can determine that, as for the packet data, the data transmission to the DMA buffer 172 is completed.

When the DMA controller 107 has completely transmitted the data to the DMA buffer 172, the controller 171 transmits necessary data to the ASIO buffer 192, according to the packet number (S25).

As mentioned above, data transmission and a notification each are performed by using different methods, in the present embodiment. In other words, the data transmission is performed continuously, irrespective of the notification. Therefore, at the time when the notification is performed, only data of 64 samples is not necessarily stored in the DMA buffer 172. For instance, at the time when the notification is performed, data of 96 samples may have already been stored in the DMA buffer 172. In this case, the next notification may be performed at the time when data of 32 samples is further transmitted. Therefore, when the next notification (notification performed at the time when data of 32 samples is further transmitted) is performed, the controller 171 refers to the packet number, and transmits necessary data to the ASIO buffer 192.

For instance, assumed that a notification is performed at the time when data of packet number 128 is transmitted after data of packet numbers 1 to 128 has been transmitted, the controller 171 transmits data of packet numbers 65 to 128 to the ASIO buffer 192. In this way, the packet data of the present embodiment includes the packet number (identification information). This makes it easy for the controller 171 to determine from which data to which data should be transmitted to the ASIO buffer 192.

Note that, the "program" includes programs for operating the audio interface driver 151 and the DMA controller 107. However, the audio interface driver 151, which is achieved by the CPU 103, may receive packet data and store it in a memory (RAM 105). In this case as well, the audio interface driver 151 causes the PC 11 to execute storing, in a memory, a sound signal transmitted from the outside by using the first stored method in which a bandwidth is guaranteed and timing is restricted, and processing, using the processor 191, the sound signal stored in the memory upon a predetermined data size of the sound signal being stored in the memory.

Finally, the present preferred embodiment is illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. An information processing method for an information system including an information processing device and an audio interface, the method comprising:
   transmitting, via the audio interface, a sound signal using a first transmission mode where a bandwidth is guaranteed and timing is restricted;
   determining, via the audio interface, whether or not a minimum data size of the sound signal required for a host application program, which is a digital audio workstation (DAW), to process the sound signal is transmitted;
   transmitting, via the audio interface, a notification using a second transmission mode where the timing is not restricted when the minimum data size of the sound signal is determined to be transmitted;
   receiving, via the information processing device, the sound signal transmitted using the first transmission mode from the audio interface;
   storing, in a memory of the information processing device, the received sound signal transmitted from the audio interface using the first transmission mode;
   receiving, via the information processing device, the notification transmitted using the second transmission mode from the audio interface;
   determining, via the information processing device, after receiving the notification from the audio interface, whether or not the minimum data size of the sound signal required for the host application program to process the sound signal is stored in the memory; and
   processing, via the information processing device, the sound signal stored in the memory to execute the host application program when the minimum data size of the sound signal is determined to be stored in the memory.

2. The information processing method according to claim 1, wherein the first transmission mode transmits the sound signal as packet data that includes information indicating a data size of the packet data.

3. The information processing method according to claim 1, wherein the first transmission mode transmits the sound signal as packet data that includes an identification number for identifying the packet data.

4. The information processing method according to claim 3, wherein the packet data includes identical identification numbers in a head and an end of the packet data.

5. An information processing system comprising:
   an audio interface comprising:
      a first communication interface that transmits a sound signal; and
      a first processor configured to:
         control the communication interface to transmit the sound signal using a first transmission mode where a bandwidth is guaranteed and timing is restricted;
         determine whether or not a minimum data size of the sound signal required for a host application program, which is a digital audio workstation (DAW), to process the sound signal is transmitted; and control the communication interface to transmit a notification using a second transmission mode where the timing is not restricted when the minimum data size of the sound signal is determined to be transmitted; and an information processing device comprising:
a second communication interface;
a memory that stores the sound signal; and
a second processor configured to:
control the second communication interface to:
receive the sound signal transmitted using the first transmission mode from the audio interface;
receive the notification transmitted using the second transmission mode from the audio interface; and
determine, after receiving the notification from the audio interface, whether or not the minimum data size of the sound signal required for the host application program to process the sound signal is stored in the memory; and
process the sound signal stored in the memory to execute the host application program when the minimum data size of the sound signal is determined to be stored in the memory.

6. An audio interface comprising:

a communication interface that transmits a sound signal; and a processor configured to:
control the communication interface to transmit the sound signal using a first transmission mode where a bandwidth is guaranteed and timing is restricted;
determine whether or not a minimum data size of the sound signal required for a host application program, which is a digital audio workstation (DAW), to process the sound signal is transmitted; and
control the communication interface to transmit a notification using a second transmission mode where the timing is not restricted when the minimum data size of the sound signal is determined to be transmitted.

* * * * *